United States Patent
Tölli et al.

(10) Patent No.: US 8,005,482 B2
(45) Date of Patent: Aug. 23, 2011

(54) MEASUREMENTS IN COMMUNICATIONS SYSTEMS

(75) Inventors: Antti Tölli, Oulu (FI); Uwe Schwarz, Veikkola (FI); Petteri Hakalin, Málaga (ES); Heikki Hirvonen, Tampere (FI)

(73) Assignee: Spyder Navigations L.L.C., Wilmington, DE (US)

( * ) Notice: Subject to any disclaimer, the term of this patent is extended or adjusted under 35 U.S.C. 154(b) by 249 days.

(21) Appl. No.: 12/245,280

(22) Filed: Oct. 3, 2008

(65) Prior Publication Data

US 2009/0075656 A1    Mar. 19, 2009

Related U.S. Application Data

(62) Division of application No. 10/526,761, filed as application No. PCT/FI02/00728 on Sep. 10, 2002.

(51) Int. Cl.
*H04W 36/00* (2009.01)
*H04W 72/00* (2009.01)

(52) U.S. Cl. .......................... 455/453; 455/436

(58) Field of Classification Search .......... 455/436–444, 455/453; 370/230, 331–333
See application file for complete search history.

(56) References Cited

U.S. PATENT DOCUMENTS

| | | | |
|---|---|---|---|
| 5,241,685 A * | 8/1993 | Bodin et al. ................... | 455/453 |
| 5,428,816 A | 6/1995 | Barnett et al. | |
| 5,530,910 A | 6/1996 | Taketsugu | |
| 5,655,217 A | 8/1997 | Lemson | |
| 5,722,072 A | 2/1998 | Crichton et al. | |
| 5,737,705 A | 4/1998 | Ruppel et al. | |
| 5,822,696 A | 10/1998 | Bergkvist | |
| 6,041,235 A | 3/2000 | Aalto | |
| 6,266,531 B1 * | 7/2001 | Zadeh et al. ................... | 455/453 |
| 6,295,450 B1 | 9/2001 | Lyer et al. | |
| 6,360,098 B1 | 3/2002 | Ganesh et al. | |
| 6,597,679 B1 | 7/2003 | Willars | |
| 6,694,138 B1 | 2/2004 | Kobylinski et al. | |
| 6,845,238 B1 | 1/2005 | Muller | |
| 6,907,245 B2 | 6/2005 | Ohisson et al. | |
| 6,944,143 B1 | 9/2005 | Bayley et al. | |
| 6,990,344 B1 | 1/2006 | Dolan et al. | |
| 7,013,141 B2 | 3/2006 | Lindquist et al. | |
| 7,065,361 B1 * | 6/2006 | Fortuna ........................ | 455/438 |
| 7,072,663 B2 | 7/2006 | Ramos et al. | |

(Continued)

FOREIGN PATENT DOCUMENTS

WO    WO 01/58197    8/2001

(Continued)

OTHER PUBLICATIONS

US Office Action for U.S. Appl. No. 10/526,761 dated Apr. 14, 2009.

(Continued)

*Primary Examiner* — Kamran Afshar
*Assistant Examiner* — Nam Huynh

(57) ABSTRACT

A method of performing compressed mode measurements for selecting communication means in a communication system. Statistics are collected on handovers from a cell in a communications system to a plurality of other cells in the communications system. A cell load of each cell of the plurality of other cells is weighted by a percentage of handovers from the cell to the respective one of the plurality of other cells. A threshold is determined based on the weighted cell loads. The threshold can be used to trigger a load based handover from the cell to one of the plurality of other cells.

18 Claims, 10 Drawing Sheets

| Cell ID | Percentage of inter-system HO to the target cell | Load of the target cell |
|---|---|---|
| Cell34 | 76% | 84% |
| Cell45 | 15% | 80% |
| Cell23 | 4% | 75% |
| Cell56 | 3% | 76% |
| ... | ... | ... |

U.S. PATENT DOCUMENTS

| | | |
|---|---|---|
| 7,181,218 B2 | 2/2007 | Ovesjo et al. |
| 7,542,779 B2 | 6/2009 | Halonen et al. |
| 2001/0009853 A1 | 7/2001 | Arimitsu |
| 2002/0019231 A1 | 2/2002 | Palenius et al. |

FOREIGN PATENT DOCUMENTS

| | | |
|---|---|---|
| WO | WO 01/20942 | 3/2002 |
| WO | WO 02/47423 | 6/2002 |

OTHER PUBLICATIONS

Office Action on U.S. Appl. No. 10/526,761, mailed Feb. 4, 2010.
Office Action on U.S. Appl. No. 10/526,761 mailed Aug. 4, 2009.
The International Search Report for PCT/FI2002/00728 mailed Apr. 4, 2003.
The International Preliminary Examination Report for PCT/FI2002/00728 completed Dec. 10, 2004.
The Communication for EP application No. 02 758 497 dated Nov. 20, 2007.
Non-Final Office Action on U.S. Appl. No. 12/245,251, mailed Dec. 3, 2010.
Non-Final Office Action on U.S. Appl. No. 10/526,761, mailed Sep. 15, 2010.
Final Office Action on U.S. Appl. No. 10/526,761, mailed Feb. 22, 2011.
Non-Final Office Action on U.S. Appl. No. 12/245,295, mailed Mar. 18, 2011.

* cited by examiner

| SERVICE \ SYSTEM/FREQ | CONVERSATIONAL | | | STREAMING | | INTER-ACTIVE | BACK-GROUND |
| --- | --- | --- | --- | --- | --- | --- | --- |
| | CS SPEECH | PS SPEECH | CS SPEECH | PS SPEECH | CS DATA | PS DATA | | |
| SYSTEM/FREQ (1) GSM/EDGE | 3 | 3 | 3 | 3 | 3 | 3 | 4 | 3 |
| SYSTEM/FREQ (2) WCDMA, f1 MACRO | 1 | 2 | 2 | 2 | 1 | 2 | 3 | 2 |
| SYSTEM/FREQ (3) WCDMA, f2 MACRO | 2 | 1 | 1 | 1 | 2 | 1 | 2 | 1 |
| SYSTEM/FREQ (4) WCDMA, f3 MICRO | 4 | 4 | 4 | 4 | 4 | 4 | 1 | 1 |
| OTHER | . . . | . . . | . . . | . . . | . . . | . . . | . . . | . . . |

Figure 5

| Cell ID | Percentage of inter-system HO to the target cell | Load of the target cell |
|---|---|---|
| Cell34 | 76% | 84% |
| Cell45 | 15% | 80% |
| Cell23 | 4% | 75% |
| Cell56 | 3% | 76% |
| ... | ... | ... |

MEASUREMENTS IN COMMUNICATIONS SYSTEMS

REFERENCE TO RELATED APPLICATION

This application is a divisional of U.S. patent application Ser. No. 10/526,761, filed Mar. 7, 2005, the disclosure of which is incorporated herein by reference in its entirety. U.S. patent application Ser. No. 10/526,761 claims the benefit of PCT/FI2002/000728, filed Sep. 10, 2002, the disclosure of which is incorporated herein by reference in its entirely.

FIELD OF THE INVENTION

This invention relates to measurements in communications systems, and especially to measurements for selection of communication means.

BACKGROUND

A diverse range of wireless communication systems are in use today enabling communication between two or more entities, such mobile stations or other user equipment. Examples of wireless communications systems include, without limiting to these, GSM (Global System for Mobile Communication), EDGE (Enhanced Data Rate for GSM Evolution), GPRS (General Packet Radio Services), and so called 3G (Third Generation) systems such as CDMA (Code Division Multiple Access) and WCDMA (Wideband CDMA). These systems are examples of radio access technologies (RAT).

Presently, GSM, a so called 2G (second generation) system, is widely used by operators of wireless networks. However, wireless systems have been developing at a rapid pace and more advanced 3G systems, such as WCDMA, are predicted to supersede 2G systems in the next few years. Network operators therefore have to consider how to migrate from one system, such as GSM or EDGE, to another, such as WCDMA, smoothly and cost effectively. One solution proposed is for an operator to maintain their existing GSM/EDGE system whilst introducing a WCDMA network that can run concurrently, and that can ultimately be merged seamlessly together with it, forming a 'multiradio' network.

FIG. 1 shows generally the architecture for a network operating under WCDMA, Such a network is sometimes referred to a Universal Mobile Telecommunications System (UMTS). The network comprises a number of base-stations (BSs) 101, 102 and 103. Each base-station has a radio transceiver capable of transmitting radio signals to and receiving radio signals from the area of cells 104, 105 and 106. By means of these signals the base-station can communicate with a mobile station (MS) 107. Each base station is linked to a single radio network controller (RNC) 108. An RNC can be linked to one or more BSs. An RNC can be linked to another RNC via an Iur interface 120. Each RNC is linked by an Iu interface 121 to a core network (CN) 109. The CN includes one or more serving nodes that can provide communication services to a connected mobile station, for example a mobile switching centre (MSC) 110 or a serving GPRS (general packet radio service) support node (SGSN) 111. These units are connected by the Iu interface to the RNCs. The CN is also connected to other telecommunications networks such as a fixed line network, PSTN (public switched telephone network), 114, the Internet 115 and another mobile network 116 to allow onward connection of communications outside the UMTS network. The BSs and the RNC and their interconnections constitute a UMTS terrestrial radio access network (UTRAN).

When the mobile station (MS) moves between cells during a communications connection there is a need to hand it over from communication with the BS of the old cell to the BS of the new cell without dropping the call due to a break in communications between the mobile station and the network. This process is known as handover. A need can also arise to hand over the MS even when it does not move, for example when local conditions affect its communications in the old cell and call quality can be improved by handing over to another cell or if there is a need to free up capacity in the old cell, e.g., due to overloading.

Handovers may also occur in other systems such as GSM or EDGE. The reasons for handover may also be similar, though it will be appreciated by one skilled in the art that the elements of the network may be different to those shown in FIG. 1 if the system differs.

In both proposed WCDMA systems and existing GSM/EDGE systems, the coverage area of the network may be made up various cell types such as macrocell, microcell and picocell. Macrocells may be defined as cells having the largest coverage area, followed by microcells, with picocells defined as cells having the smallest coverage area. It should be appreciated that areas containing a large number of MSs, such as in cities, would generally be served by microcells or picocells, as a collection of several microcells or picocells would be able to handle more MSs and traffic than a macrocell with the same coverage area. Conversely, areas with lower MS numbers would generally be served by macrocells. However, the types of cells used in any given area are not mutually exclusive, and typically a layered approach may be adopted. This is where macrocells, microcells and picocells are all used within the same area in an overlapping/layered manner. The result is a more robust network that is better equipped to handle traffic fluctuations as handovers can be more effectively used to share traffic load across the overlapping layers of cells and not just to extend coverage across adjacent cells.

Such a layered approach is particularly important in a multiradio network, which may incorporate, for example, both GSM/EDGE and WCDMA. FIG. 2 shows a layered structured of cells in an example of pan of a multiradio network cell structure 400. The network comprises a macrocell layer 250 of a macrocell 201 operating under GSM/EGDE and a macrocell 202 operating under WCDMA at frequency f1. With substantially the same coverage area as the macrocell layer is a microcell layer 260. The microcell layer 260 comprises microcells 203, 204 and 205 operating under GSM, and microcells 206, 207 and 208 operating under WCDMA at frequency f2. Another layer, a picocell layer 270, operates below the microcell layer. The picocell layer 270 comprises picocells 209 and 210 operating under WCDMA at frequency f3, 211 and 212 operating under TDD (Time Division Duplex access mode), and 213, 214, 215 and 216 operating under a WLAN (wireless local area network) system. This layered architecture is particularly suited to traffic load sharing described earlier.

It should be appreciated that the number and coverage area of each type of cell may vary, and is not limited to those depicted in FIG. 2. For example, the macrocells may have the same coverage area as 4 or 5 microcells instead of the 3 depicted.

In a multiradio network, it is important to utilize all the systems (e.g. GSM, WCDMA) or carriers (e.g., different layers of WCDMA operating at different frequencies) in the most efficient way possible. For example, the coverage area of the network can be increased by moving users from one cell to an adjacent cell, such as between GSM microcells 203 and 204, or WCDMA picocells 209 and 210 by utilizing handover techniques.

The capacity of the network can also be increased by moving users from a highly loaded cell to one with a low load by utilizing traffic reason handover techniques.

Service changes may also trigger a handover. Typical services may include real time services such as conversational communications (at various data rates), data streaming (at various data rates), and non real time services such as interactive web browsing and emailing. A handover may take place when a neighboring cell/system is better suited to provide the service requested.

Traffic load handover may be triggered when the load of a cell increases beyond a certain threshold, and the overloaded cell instructs one or more of the MSs in the cell to perform handovers.

In general, these handovers fall into two types: inter-frequency/carrier (IF) and inter-system (IS) or inter-RAT (Radio Access Technology). IF handover takes place when the systems of the cells stay the same, but the frequency of the systems change. This can occur for example between WCDMA systems operating in different frequency bands. For example, a handover from WCDMA macrocell 202 to WCDMA microcell 207 would constitute an IF handover. IS handover is handover across systems. For example, a handover from WCDMA microcell 207 to GSM macrocell 201, or from WLAN picocell 213 to WCDMA picocell 209 would constitute IS handovers.

Present radio access networks have consisted of just a single radio access network, such as GSM, or several independent systems. Some functionality is available for load sharing and interference distribution within GSM networks, but the efficiency of such methods are limited to the area controlled by the associated radio resource controller, such as or a Base Station Controller (BSC) in GSM system or an RNC in the WCDMA system illustrated in FIG. 1. As such, selection of the new cell/system in handovers in a multiradio system has been less than adequate. This is partly due to the limitations in the signaling between the different controllers. Thus, load information sharing is not generally available between cells, and selection of a new cell/system is based only on received signal strength or quality and some predefined offsets and parameters. These may include, for example, minimum signal level thresholds for target system/cell to be selected or some offset for target system/cell's signal strength over the current level in the source cell.

To this end, Common Resource Radio Management (CRRM) and Common Radio Management Server (CRMS) have been introduced to help manage some of these issues that have arisen in multiradio systems. Their roles include overall resource management of controller and system borders to provide load sharing for efficient use of resources, interference distribution to provide higher spectral efficiency and improved QoS (quality of service) management. CRRM can be implemented in both a centralised in a CRMS and distributed manner across other elements such as RNCs.

FIG. 3 illustrates the structure of a typical distributed CRRM arrangement. Here the CRRM entities, 304, 306 and 308, are located at each of the RNCs/BSCs 301, 302 and 303. Radio resource management within each controller is managed by the Radio Resource Management entity (RRM), 305, 307 and 309. The CRRMs are responsible for control between the RRM entities, and communication between the controllers is done via the CRRMs.

FIG. 4 illustrates the structure of a centralised CRRM arrangement utilizing a CRMS. The arrangement comprises RNC/BSC 403, 405 and 406, associated with RRMs 404, 406 and 408 respectively. Control of these RRMs is done by a centralized CRRM entity, the CRMS 401.

When a MS is connected to a GSM cell, the transmission gaps in GSM communications can be used for continuous measurements of other systems or layers to assist in handovers. These measurements may include determining cell ID (identity) information required for connecting to a cell of new system/frequency. However, when a MS is in connected to a WCDMA cell its scope for making measurements at other frequencies or of other systems is significantly reduced because of the continuous transmission nature of communications in WCDMA. Therefore, any measurements in WCDMA have to be typically performed in compressed mode.

In compressed mode, reception of a signal is stopped for a certain period of time to enable the MS to measure at another frequency. To achieve this, the data has to be compressed before sending it to the MS. This data compression is controlled by the RNC.

However, in compressed mode, data is transmitted at a higher power, generating more interference, which affects cell capacity further. Therefore, measurements in compressed mode are generally kept to a minimum. Compressed mode measurements take time, which delays the handover procedure. Simultaneous IF and IS compressed mode measurements might not be allowed due to practical limitations such as time limitations on measurement of multiple neighbor cells. Furthermore the number of GSM BSICs (base station identification codes) that can be decoded from neighboring cells is limited. All these factors impose practical limitations on the number of target cells that can be measured before handover takes place.

As both IF and IS compressed mode measurements made simultaneously might not be possible, the selection between IF and IS compressed mode measurements must be made after handover is triggered. If the selection is based on only signal strength and/or service priorities then the undesirable selection of a highly loaded cell is possible. Furthermore, as CM measurements are time consuming, a reduction in such measurements is desirable to reduce handover delays. Selecting the correct system is also important. For example, if the call is a circuit switched speech service then preference may be for the cell to be a GSM microcell. Conversely, if the call is packet switched conversational service (e.g., video telephony) then a WCDMA cell may be preferred.

Another problem arises when a MS is connected to a WCDMA cell and is making IS compressed mode measurements to GSM cells. IS compressed mode measurements generally take two parts: a received signal strength indicator (RSSI) measurement from all neighboring GSM cells; and BSIC decoding for all (RSSI) measured neighboring GSM cells. BSIC decoding is very time consuming, and typically, the BSIC of the measured GSM neighbor with the highest RSSI is decoded and chosen as the target cell.

This can significantly reduce CRRM performance since a highly loaded GSM cell could be selected as a target cell even if there were lower loaded cells with adequate signal levels available.

When setting the threshold over which handover should be triggered in a source cell, factors such as potential overlap of the neighboring cells as well as the neighboring cells' loads should be considered. Handover should only be triggered if there are neighboring cells available to handover to with a lower load, hence any threshold that is set for a source cell must take this into account. Neighboring cells that are not overlapping or at adjacent to the source cell should not influence the setting of the threshold as much. However, when handover is to be made intersystem, then information relating to the precise coverage area of target cells may not be readily available, thus making calculation of a handover threshold for the source cell difficult when presented only with a list of neighboring cells and their associated loads. The problem is not just limited to intersystem handovers, and similar problems arise with inter-frequency handovers and trying to estimate cell loads and handover thresholds.

SUMMARY

Embodiments of the present invention aim to overcome one or several of the above problems.

According to one aspect of the present invention, there is provided a method of performing compressed mode measurements for selecting communication means in a communication system, said communication system comprising a network element and a plurality of communication means for serving a mobile station and, said method comprising: providing information associated with the plurality of communication means to the network element, said information based on a plurality of parameters associated with each of the plurality of communication means; ordering the communication means based on said information; performing compressed mode measurements at the mobile station based on said ordering.

The selection may be for handover of the mobile station from a first communication means to a second communication means. Furthermore, the first communication means may operate at a first frequency of a radio access technology and the second communication means may operate at a second frequency of said radio access technology.

Preferably the radio access technology is code division multiple access or wideband code division multiple access.

The first communication means may operate in accordance with a first radio access technology, and the second communication means may operate in accordance with a second, different, radio access technology. Furthermore, the first radio access technology may be code division multiple access or wideband code division multiple access.

Preferably, the communication means comprises a plurality of cells, and the compressed mode measurements comprise signal strength measurements of at least one of said plurality of cells.

Preferably, the compressed mode measurements comprise decoding a parameter associated with at least one of the plurality of cells. The parameter may be the base station identification code associated with one of the plurality of cells.

The plurality of parameters may comprise at least one of the following: a real time load, a non real time load, a service priority weight or a signal to interference ratio.

Preferably, the information comprises a weighting value. The communication means may be ordered in a prioritized order.

The network element may be a radio network controller, and the information may be provided by a common resource radio management. The common resource radio management may be a common radio management server.

According to a second aspect of the present invention, there is provided a communication system comprising: a network element, a mobile station, a plurality of communication means, said communication means arranged to serve said mobile station; means for providing information associated with the plurality of communication means to the network element, said information based on a plurality of parameters associated with each of the plurality of communication means; and means for ordering the communication means based on said information; said mobile station arranged to perform compressed mode measurements based on said ordering for selecting one of the plurality of communication means.

According to a third aspect of the present invention there is provided a method of determining a threshold for a cell in a communication system, said communication system comprising said cell and a plurality of other cells, said method comprising the steps of: collecting statistics on the handovers from said cell to said plurality of other cells; weighting the cell load of each cell of said plurality of other cells by the percentage of handovers from said cell to respective one of said plurality of other cells; and determining the threshold based on said weighted cell loads.

Preferably the weighting comprises multiplying said cell load by said percentage for each cell, and the threshold is determined by adding together all the weighted cell loads.

BRIEF DESCRIPTION OF THE DRAWINGS

Embodiments of the present invention will now be described by way of example with reference to the accompanying drawings, in which:

FIG. 5 illustrates measurement table according to one embodiment of the present invention.

DETAILED DESCRIPTION

Handover in a cell can be triggered by various factors such a mobile station moving out of the coverage area of a cell, in an attempt to spread traffic load from a highly loaded cell to less loaded cells, or when a request for a different service is made.

In a preferred embodiment of the present invention, a prioritized measurement list or table for system or frequency (in a system) in the network is generated by the CRRM, and maintained at either a CRMS (centralized CRRM arrangement), at all the RNCs in network (distributed CRRM arrangement), or any other suitable network element(s). FIG. 5 illustrates a typical prioritized measurement table, 500.

The first column of the measurement table 500 lists the target system/frequency, each of which may include a plurality of cells operating under the given system at the given frequency. The list shown here has a single entry for a GSM/EDGE system. The other columns provide a value to each system/frequency for various services, such as conversational circuit switched (CS) speech in the column 2, and streaming packet switched (PS) data in the column 7. The conversational and streaming services are classed as real time (RT) services, and the interactive and background service in FIG. 5 are classed as non real lime (nRT) services.

The values in the measurement table provide a prioritized indication of the order that any compressed mode (CM) measurements should be performed in by a mobile station that wishes to handover to another cell of a system/frequency. For example, the system/frequency best suited to receiving a handover may be allocated the highest priority value (or first measurement order) of 1, and CM measurements should then be made with system/frequency first in an attempt to handover to it.

Figure 1:
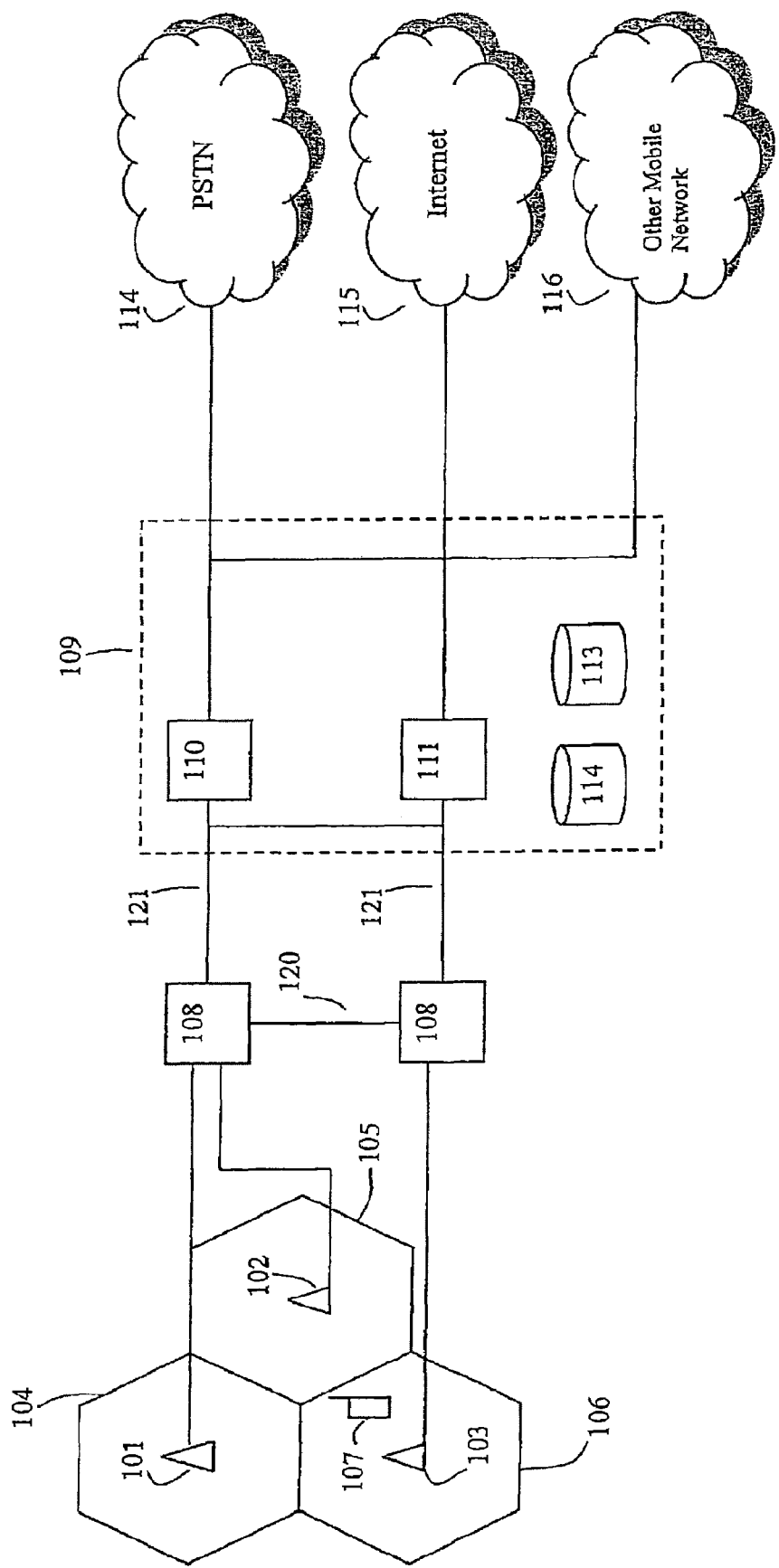
FIG. 1 illustrates the general architecture of a telecommunications system.
Figure 2:
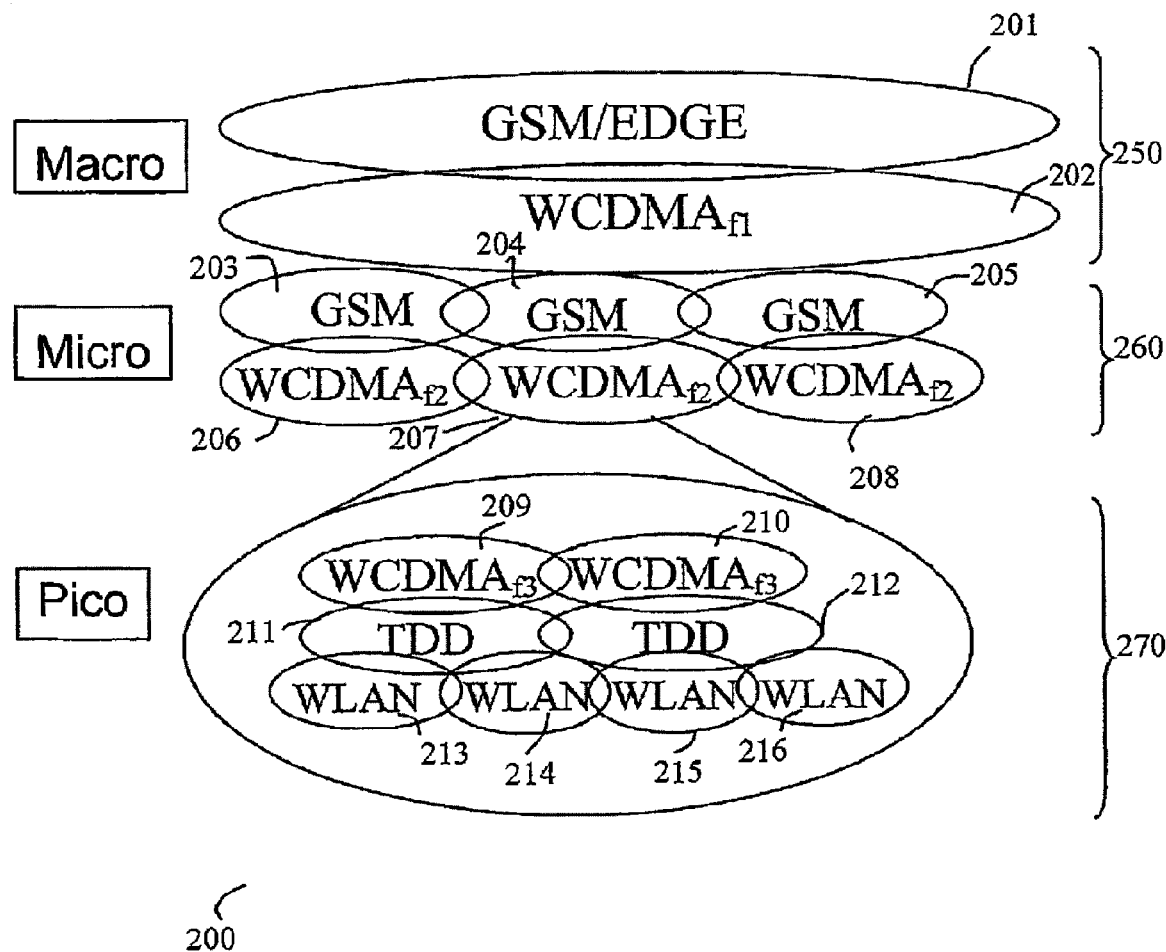
FIG. 2 illustrates the layered cell structure of a multiradio network.
Figure 3:
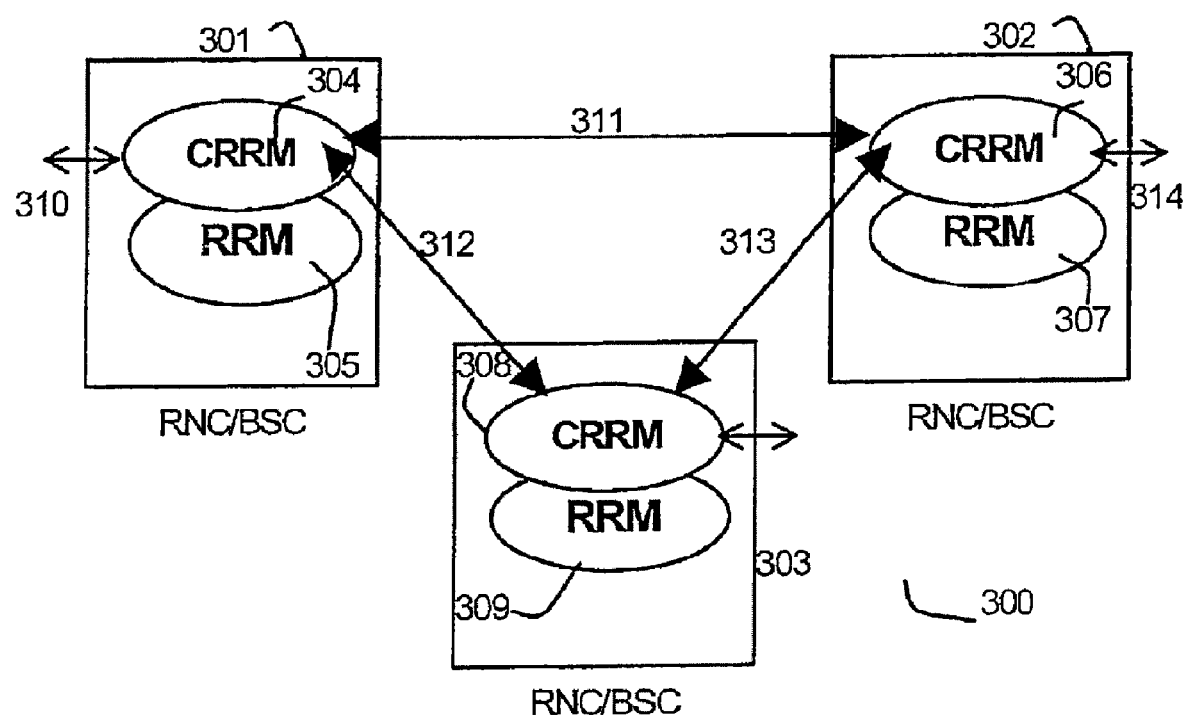
FIG. 3 illustrates the structure of a distributed CRRM arrangement.
Figure 4:
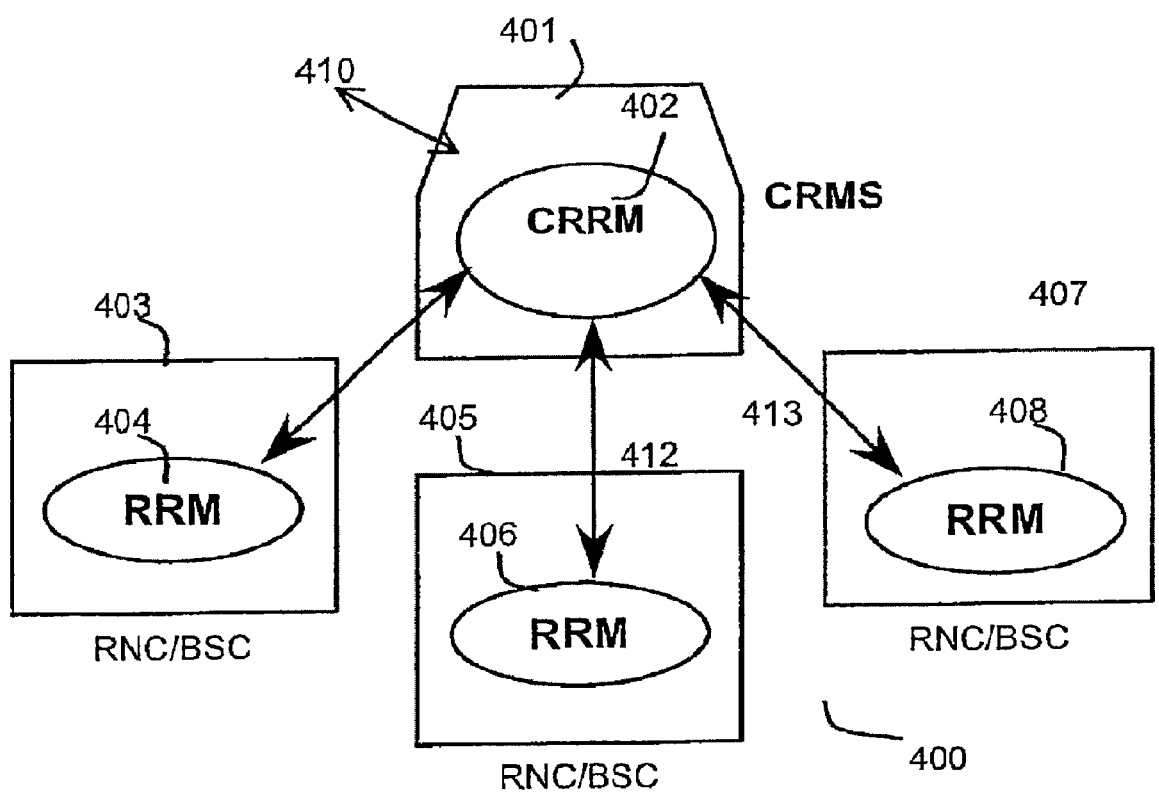
FIG. 4 illustrates the stricture of a centralized CRRM arrangement utilizing a CRMS.
Figure 6:
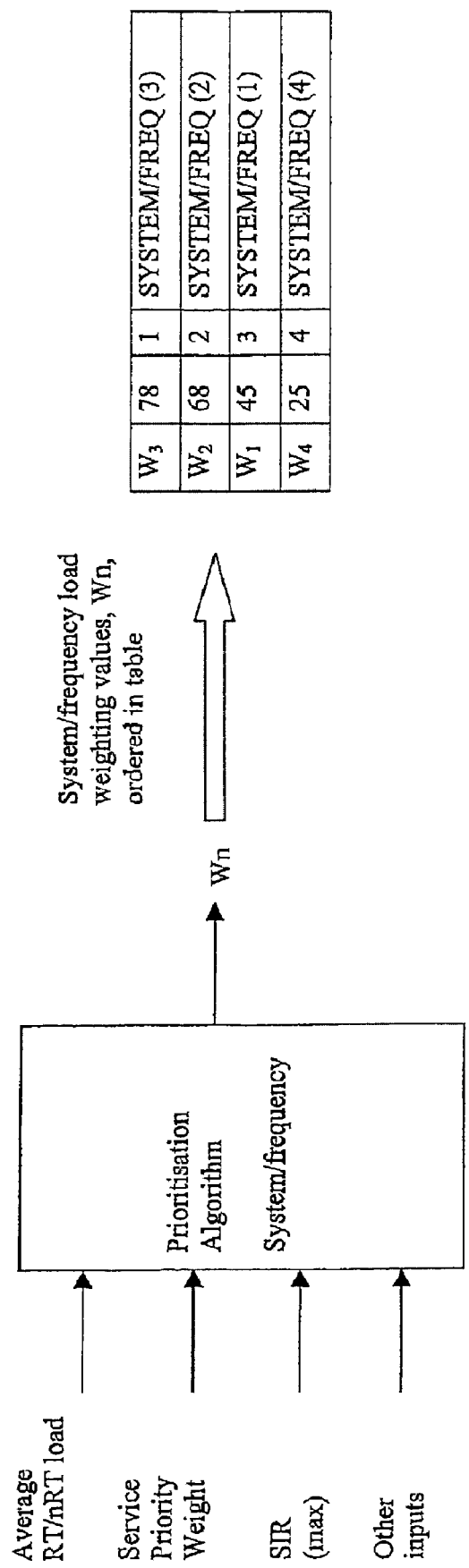
FIG. 6 illustrates the determining and prioritizing of cells according to load.

FIG. 6 illustrates how the values in the measurement table, priority indicators, may be calculated. An algorithm calculates a weighting value, Wn, for all systems/frequencies, including that of the present cell, from information such as average RT or nRT load, service priority weight (some systems will be better equipped to handle certain services), average cell quality, and other parameters. A fuzzy logic approach may be used in the algorithm. The weighting values, Wn, are ordered to create a list indicating each system/frequency's relative ability to handle the handover of a mobile station for a given service, with those systems/frequencies with the highest weighting allocated the highest priority indicator, or measurement order. Here, system/frequency (4) has generated a weighting value of 25, the lowest, and has therefore been assigned the lowest priority indicator (or last measurement order), 4. The priority indicators in FIG. 6 are calculated for each service and used to create the measurement table 500 providing a complete list of system/frequency priorities for all services.

The measurement table may be updated periodically or may be event driven, for example when the loading in a cell or system changes by a certain amount. Other events occurring in a cell or to system could also trigger a recalculation of the table, as could manual changes to the algorithm used.

The different systems/frequencies may be different communication means operating in accordance with different radio access technologies, such as GSM or WCDMA. The radio access technologies may further operate under different frequencies such as WCDMA(frequency1) and WCDMA (frequency2).

Figure 7:
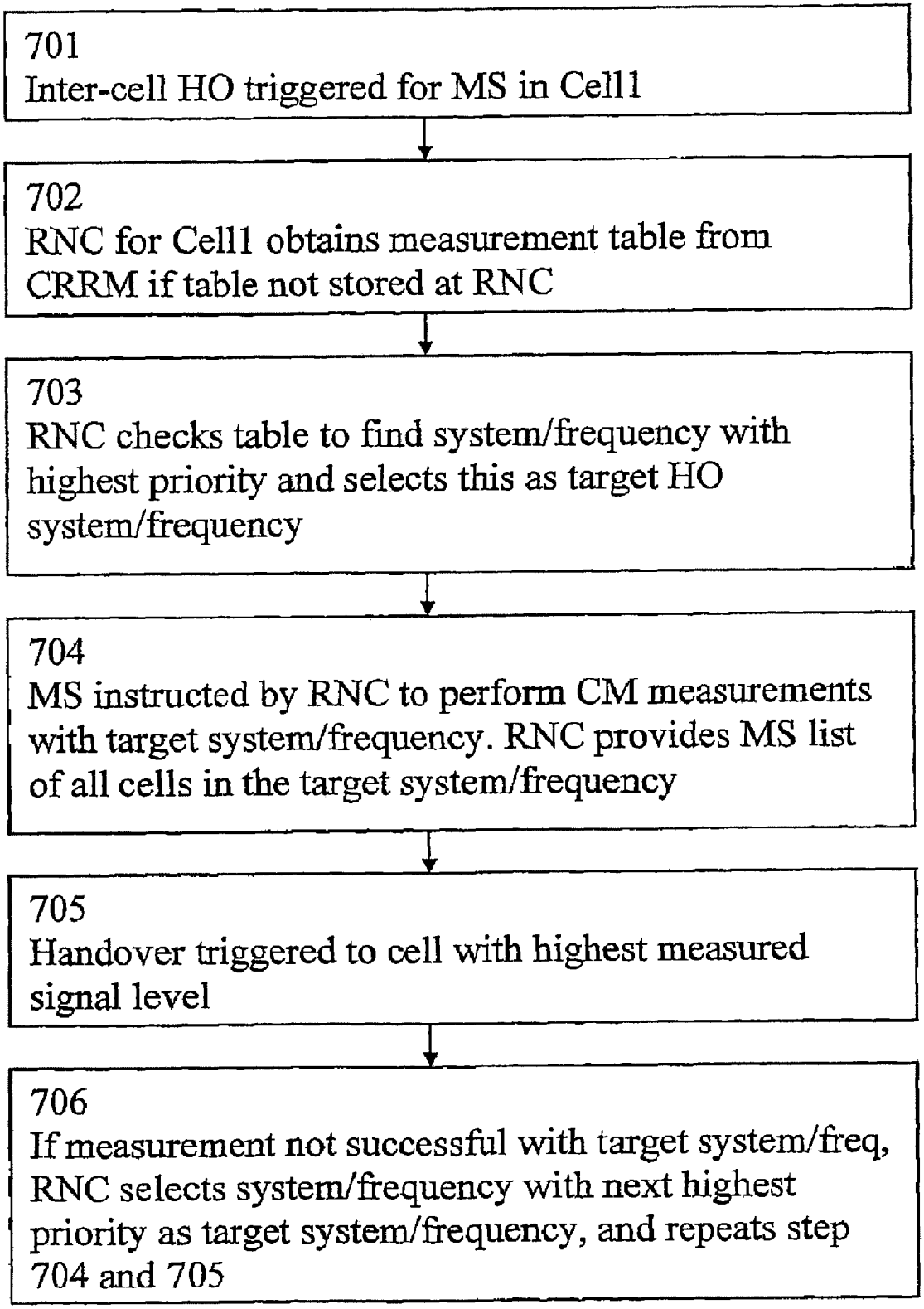
FIG. 7 is a flow diagram for one embodiment of the present invention.

FIG. 7 shows a flowchart illustrating how a preferred method of the invention can utilize the measurement table 500.

FIG. 7 describes the following:

1. Inter-cell handover is triggered for a MS in Cell 1 for a reason such as change in service or to spread cell load, step 701.

2. In step 702, if the RNC does not have the measurement table stored locally, requests it form the CRRM. The requested table may be a cut down version of the one shown in FIG. 5, which includes only entries for the service requested by the MS.

3. The RNC checks the measurement table to find the system/frequency with the highest priority, and selects this as the target handover system/frequency, step 703.

4. The RNC instructs the MS to perform CM measurements to rind target handover cell, step 704. The RNC does this by providing the MS with a list of all cells in the target system/priority to perform CM measurements on.

5. Handover is then triggered to the cell with the highest measured signal level, step 705. This helps filter out those cells in a system/frequency that may be out of the general coverage area of the MS.

6. If CM measurement is not successful or possible with the cells in the target handover system/frequency, the RNC selects the system/frequency with the next highest priority as the new target handover system/frequency, step 706, and the process of steps 704 and 705 are repeated.

The measurement table may typically have one general entry covering all cells of a different system such as a GSM/EDGE system. If IS handover is selected, then the CM measurements made by the MS may also include RSSI measurements and BSIC decoding, which is required to select and connect to the optimum GSM/EDGE cell.

One advantage of the above method is that all systems/frequencies in the area have been optimally sorted according to their capability for receiving a MS in a handover. The result is that CM measurements are kept to a minimum, and only performed according to the prioritized measurement table. Furthermore, the prioritization can also take into account different systems, such as GSM/EDGE. This has the advantage of overcoming the problem of previously being limited by the number of IF or IS CM measurements than can practically be done, as now a decision has already been made as to whether to perform IF or IS prior to starting any measurements.

Cell load may be better shared in the embodiment described above as those residing in a lightly loaded system/frequency may be given a higher priority, so that handover is more likely to take place to such cells. As a result, calls may be better handled, with fewer drop-outs for users during a call due to excessive loading. The capacity of the network as a whole may also be optimized, with the total number of handovers reduced, as a result of this optimized method.

As fewer CM measurements may result in preferred embodiments of the invention, the actual time taken to perform a hand over may be reduced. As pointed out above, if the target cell is actually another system, then IS handover must take place. In another embodiment of the present invention, a prioritized neighbor cell list is generated by the CRRM. The list contains an indicator of the attractiveness for handovers of each cell in a given system. The indicator may be represented as a numerical value, and the list may be prioritized according to this indicator. The list can either be generated centrally at the CRMS or at the relevant RNC under the control of the CRRM. In both cases, the list is available at the RNC, which uses it to determine a prioritized order in which the BSIC of the neighboring cells in the system should be decoded in.

The indicator may be generated based on information relating to the neighboring cells such as cell load, signal strength, QoS, cell capacity, service priorities, and cell quality indicators.

Figure 8:
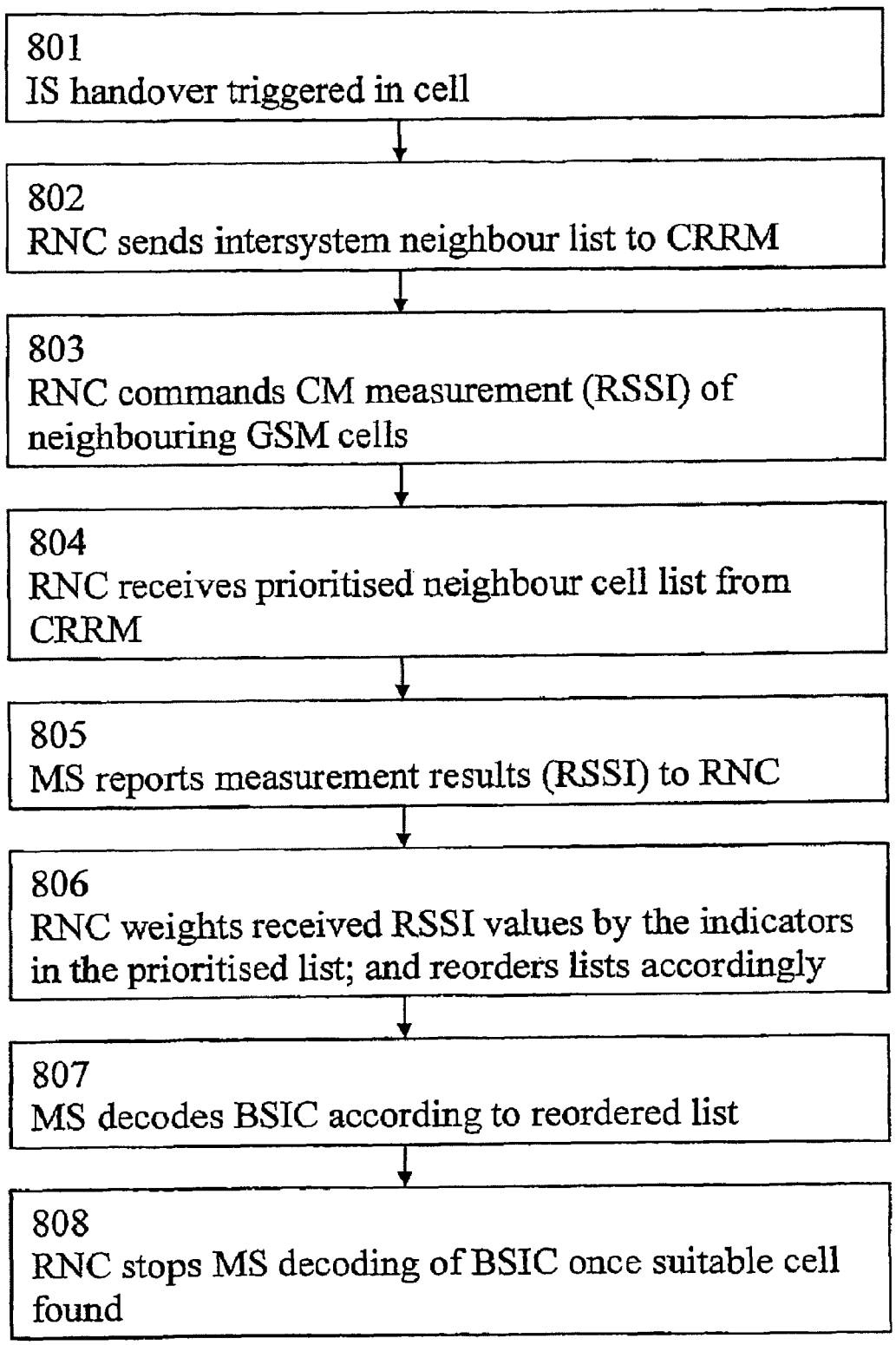
FIG. 8 is a flow diagram for another embodiment of the present invention.

FIG. 8 shows a flowchart illustrating one preferred method utilizing the prioritized neighbor cell list to determine a prioritized order for BSIC decoding.

FIG. 8 describes the following:

1. IS handover is triggered for MS in a cell, step 801, to a GSM system.

2. RNC sends inter system neighbor list to CRRM, step 802.

3. RNC commands MS to begin CM measurements of the RSSI of neighboring GSM cells, step 803;

4. RNC receives prioritized neighbor cell list from CRRM, step 804.

5. MS reports the results of the RSSI CM measurements to RNC, step 805.

6. RNC weights received RSSI values by the indicators in the prioritized list, step 806, then reorders the list accordingly. One way of weighting the RSSI values by multiplying the RSSI values by the associated indicators in prioritized list. The list can then be reordered according to the result of this weighting to give a reordered prioritised list that takes into account the measured RSSI value.

7. MS then decodes BSIC according to the reordered prioritized list, step 807.

8. RNC instructs MS to stop BSIC decoding once a suitable cell, i.e., one that has been successfully decoded, is found.

It should be noted that the method described above is based on a centralized CRRM arrangement, where the CRRM provides the prioritized list. The same method may be employed in a distributed CRRM arrangement, where the CRRM instructs the RNC to generate the prioritized list, and providing the RNC with the relevant inputs such as cell loads, service priorities, etc.

Figure 9:
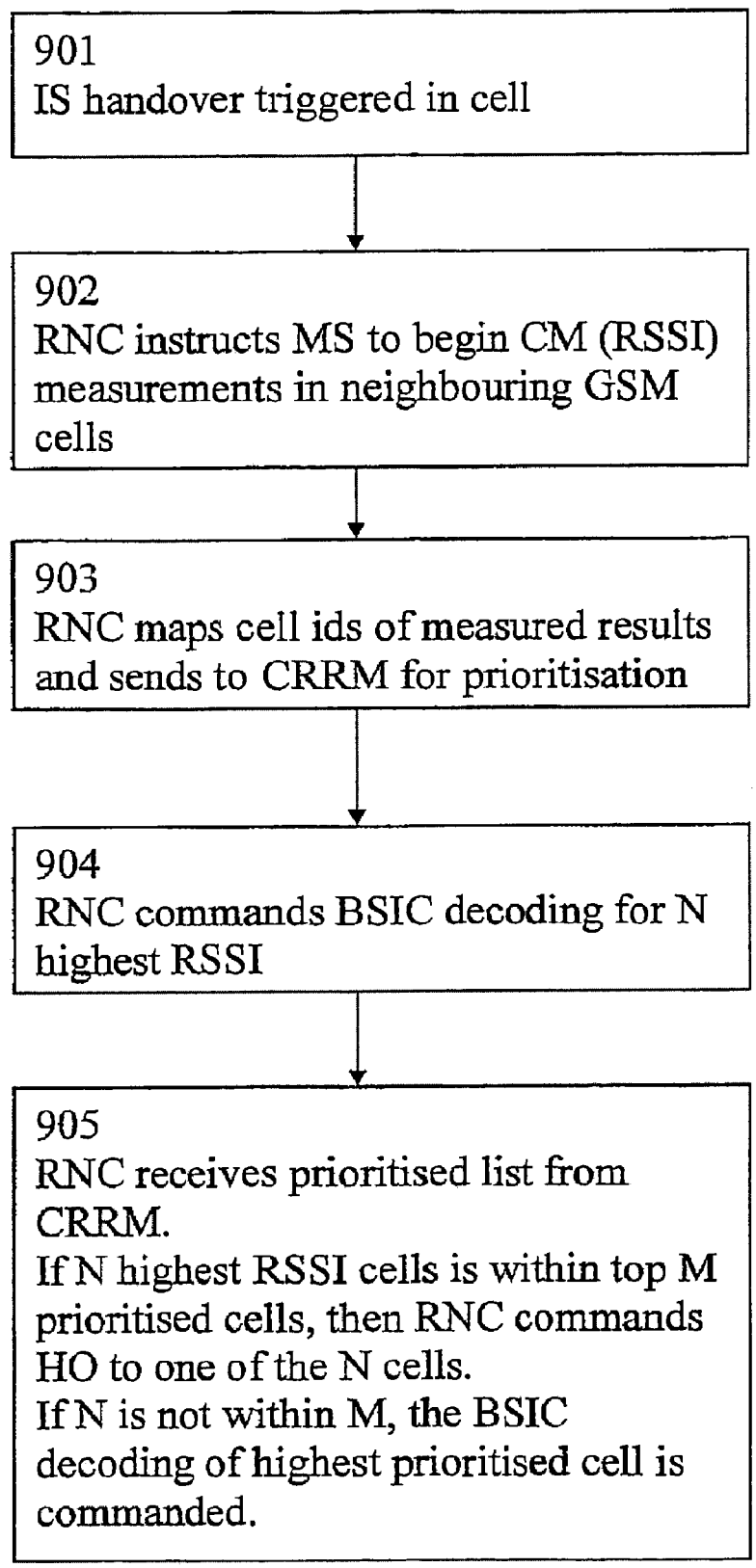
FIG. 9 is a flow diagram for another embodiment of the present invention.

An alternative method of generating and utilizing a prioritized neighbor cell list is shown in the flow diagram in FIG. 9.

FIG. 9 describes the following:

1. IS handover is triggered for a MS in a cell, step 901, to a GSM system.

2. RNC instructs MS to begin CM measurements of the RSSI of neighboring GSM cells, step 902.

3. RNC maps cell identifiers to the measured RSSI cells and sends to CRMS with RSSI measurements for prioritization, step 903.

4. RNC commands MS to perform BSIC decoding for the N highest RSSI measured cells, step 904. If N is set to 1, then only the cell with the highest RSSI is measured and BSIC decoded.

5. RNC receives a prioritized neighbor cell list from the CRMS, step 905. If the N highest measured RSSI cells is within the top M prioritized neighbor cell list, then the RNC commands handover of the MS to one of the N cells (typically the top prioritized cell). If none of the N cells fall within the top M prioritized cells, then BSIC decoding of the highest prioritized cell is commanded by the RNC, and handover to that cell is performed.

The values of N and M may be set to various values, and may depend on the capacity of the system.

As already highlighted, when IS handover takes place, BSIC decoding is required, which is computationally very time consuming. In the past, this has meant that typically only BSIC decoding of the cell with the highest measured RSSI is performed. The result is that a highly loaded cell could be selected even if there were lower loaded cells available. The above methods provide for optimized handover that takes into account neighbor cell load, which helps avoid handovers to highly loaded cells. Optimized handover is also achieved using minimum CM measurements.

In the above embodiments, load based handover may he triggered when a predetermined threshold in the source cell is reached. This threshold may be set in various ways by the CRRM or any other appropriate network element such as a RNC.

In another embodiment of the present invention, statistics are collected on which of the neighboring cells of a source cell have been the subject of handovers. Each neighbor cell load value is weighted by the percentage of handovers performed to the cell from a source cell. The resulting average weighted load is used to determine the load threshold for the source cell. Similarly, statistics may be gathered for handovers to the source cell from other cells, thus providing greater statistical accuracy for weighting each neighbor cell load of the source cell.

The same averaging method may also used in the target system/frequency selection algorithm described above, and not just to determine the load threshold. Furthermore, the calculation of the average weighted load is not limited to just neighboring cells, but also between systems to neighboring systems.

Figures 10, 11:
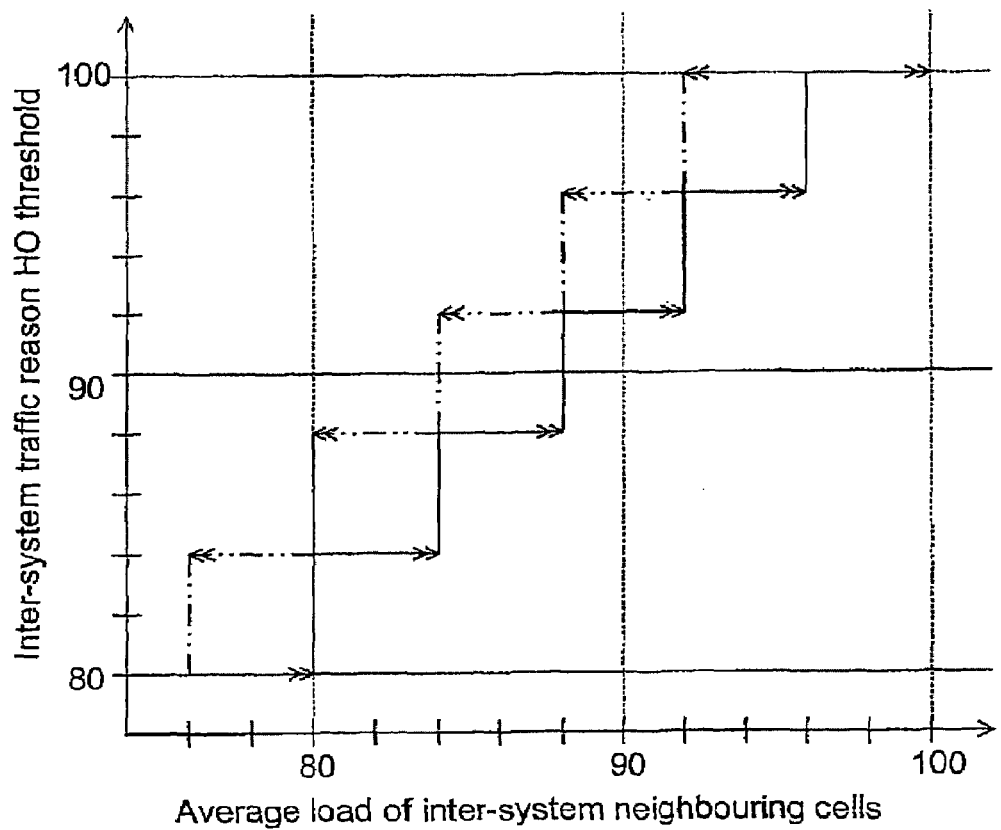
FIG. 10 is a table showing the typical HO and neighboring cell load statistics for a cell.
FIG. 11 is a graph showing how threshold values may be set.

FIG. 10 shows a table listing handover statistics for a source cell. The IF/IS load average for this source cell is calculated by multiplying each neighbor cell load by its corresponding handover percentage as follows:

$$0.76*84\%+0.15*80\%+0.04*75\%+0.03*76\%+\ldots=81.12\%$$

The new threshold may then beset according the graph shown in FIG. 11.

FIG. 11 shows a graph illustrating a hysteresis method for determining the new threshold by using the average load calculated above. The new threshold set using this method is done at discrete levels in accordance with the average calculated load. For example, with reference to the graph, if the average neighbor load is calculated to be 82% and the current threshold is at 80%, then the new threshold will be set to 84%. However, if the average neighbor load is calculated to be 84% and the current load threshold is at 84%, then the threshold will remain the same. It will not be reset until average load goes over 84%, when it will be reset to 88%.

The hysteresis in this method also means that thresholds are not reset too frequently due to minor fluctuations in the average neighbor load, which may result in handover to he triggered when the average load of the neighboring cells differ only marginally to that in the source cell.

Instead of, or in addition to, the load percentage, the available capacity (e.g., time slots, available transmission power) or any other measurement associated with the neighboring cells could also be used in the calculation of the weighted average.

It is also noted herein that while the above describes exemplifying embodiments of the invention, there are several variations and modifications which may be made to the disclosed solution without departing from the scope of the present invention as defined in the appended claims.

What is claimed is:

1. A method comprising:
    collecting statistics on handovers from a cell in a communications system to a plurality of other cells in the communications system;
    weighting a cell load of each cell of the plurality of other cells by a percentage of handovers from the cell to a respective one of the plurality of other cells; and
    determining a threshold based on the weighted cell loads, the threshold used to trigger a load based handover from the cell to one of the plurality of other cells, wherein the threshold is determined by adding together all the weighted cell loads.

2. The method of claim 1, wherein the weighting comprises multiplying the cell load by the percentage for each cell.

3. The method of claim 1, further comprising collecting statistics on handovers to the cell in the communications system from the plurality of other cells in the communications system.

4. The method of claim 1, further comprising collecting intersystem statistics on intersystem handovers from the communications system to a neighboring system.

5. The method of claim 4, further comprising weighting a system load of a neighboring system by a percentage of handovers from the cell to the neighboring system.

6. The method of claim 5, wherein the threshold is based in part on the weighted system load.

7. A network element configured to:
   collect statistics on handovers from a cell in a communications system to a plurality of other cells in the communications system;
   weight a cell load of each cell of the plurality of other cells by a percentage of handovers from the cell to a respective one of the plurality of other cells; and
   determine a threshold based on the weighted cell loads, the threshold used to trigger a load based handover from the cell to one of the plurality of other cells, wherein the threshold is determined by adding together all the weighted cell loads.

8. The network element of claim 7, wherein the weighting comprises multiplying the cell load by the percentage for each cell.

9. The network element of claim 7 further configured to collect statistics on handovers to the cell in the communications system from the plurality of other cells in the communications system.

10. The network element of claim 7 further configured to collect intersystem statistics on intersystem handovers from the communications system to a neighboring system.

11. The network element of claim 10 further configured to weight a system load of the neighboring system by a percentage of handovers from the cell to the neighboring system.

12. The network element of claim 10, wherein the threshold is based in part on the weighted system load.

13. A communications system comprising:
   a cell;
   a plurality of cells; and
   a network element configured to:
   collect statistics on handovers from the cell to each cell of the plurality of cells;
   weight a cell load of each cell of the plurality of cells by a percentage of handovers from the cell to each cell of the plurality of cells; and
   determine a threshold based on the weighted cell load, the threshold used to trigger a load based handover from the cell to one of the plurality of cells, wherein the threshold is determined by adding together all the weighted cell loads.

14. The communications system of claim 13, wherein the weighting comprises multiplying the cell load by the percentage for each cell.

15. The communications system of claim 13, wherein the network element is further configured to collect statistics on handovers to the cell in the communications system from the plurality of other cells in the communications system.

16. The communications system of claim 13, wherein the network element is further configured to collect intersystem statistics on intersystem handovers from the communications system to a neighboring system.

17. The communications system of claim 16, wherein the network element is further configured to weight a system load of the neighboring system by a percentage of handovers from the cell to the neighboring system.

18. The communications system of claim 17, wherein the threshold is based in part on the weighted system load.

* * * * *

UNITED STATES PATENT AND TRADEMARK OFFICE
CERTIFICATE OF CORRECTION

| | | |
|---|---|---|
| PATENT NO. | : 8,005,482 B2 | Page 1 of 1 |
| APPLICATION NO. | : 12/245280 | |
| DATED | : August 23, 2011 | |
| INVENTOR(S) | : Tolli et al. | |

It is certified that error appears in the above-identified patent and that said Letters Patent is hereby corrected as shown below:

Column 1, line 11, delete "entirely." and insert -- entirety. --.

Signed and Sealed this
Twenty-first Day of February, 2012

David J. Kappos
*Director of the United States Patent and Trademark Office*